W. A. DORSEY.
CAR.
APPLICATION FILED JULY 7, 1919. RENEWED FEB. 24, 1922.
1,417,044.
Patented May 23, 1922.
4 SHEETS—SHEET 1.
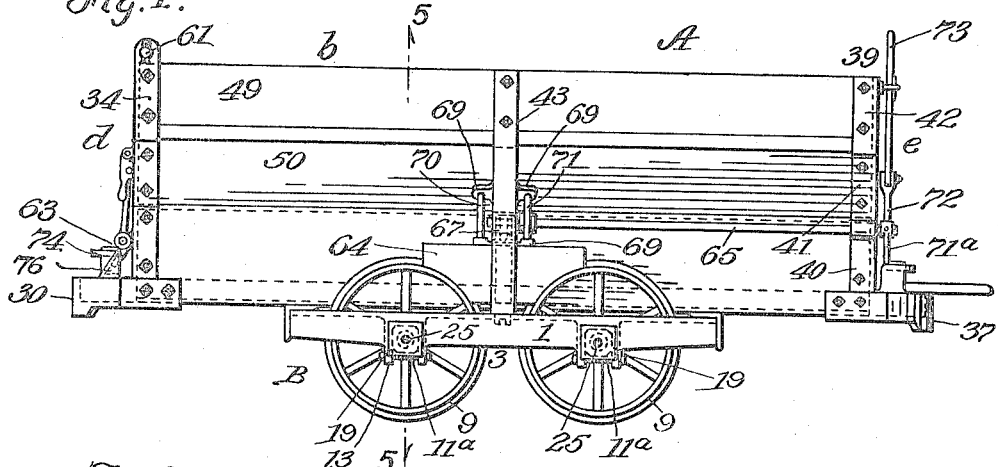
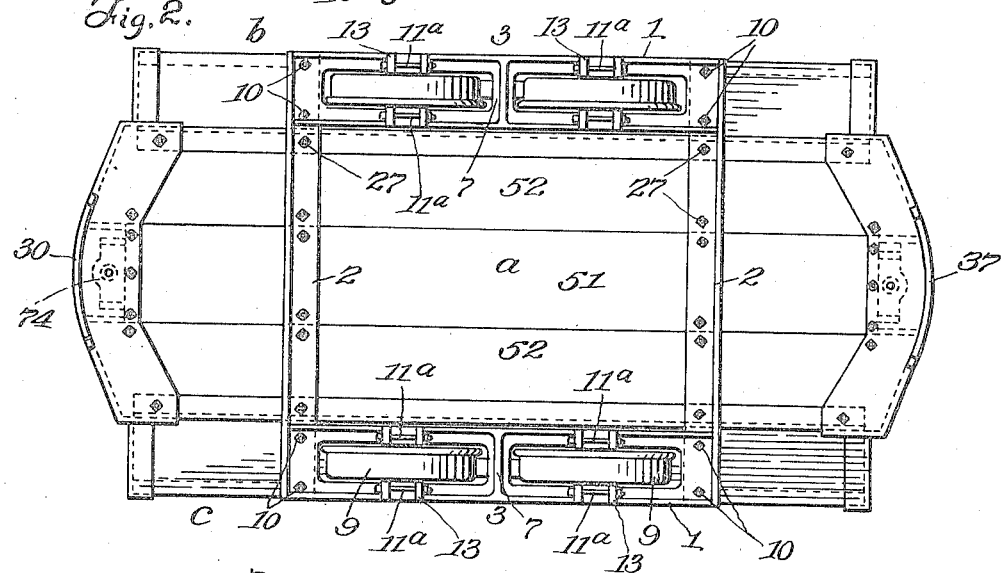
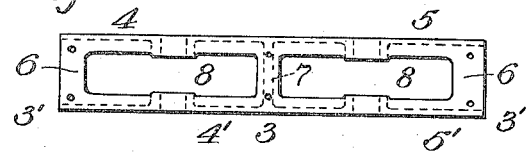
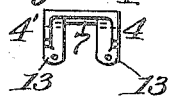
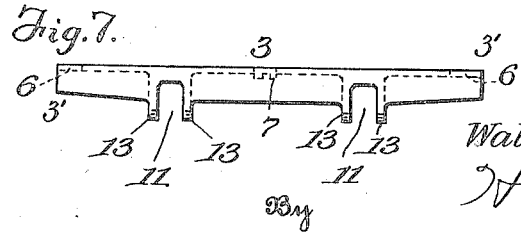
Inventor
Walter A. Dorsey
H H Bliss
By Attorney.

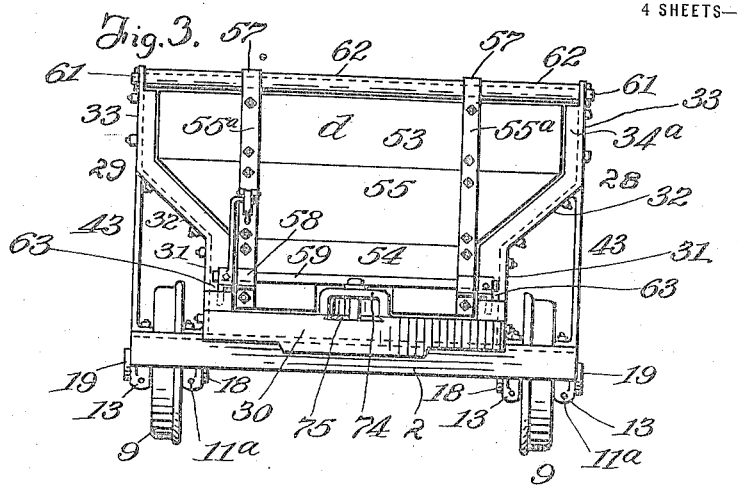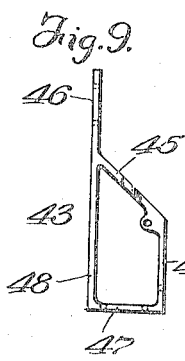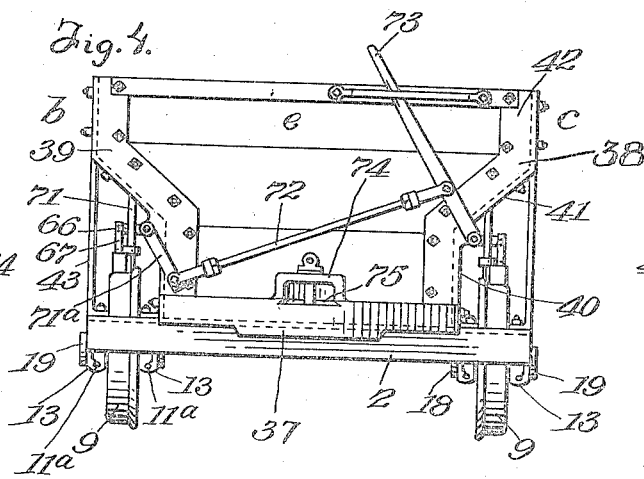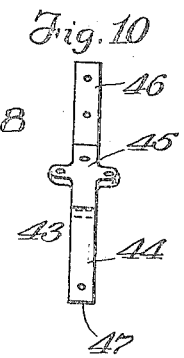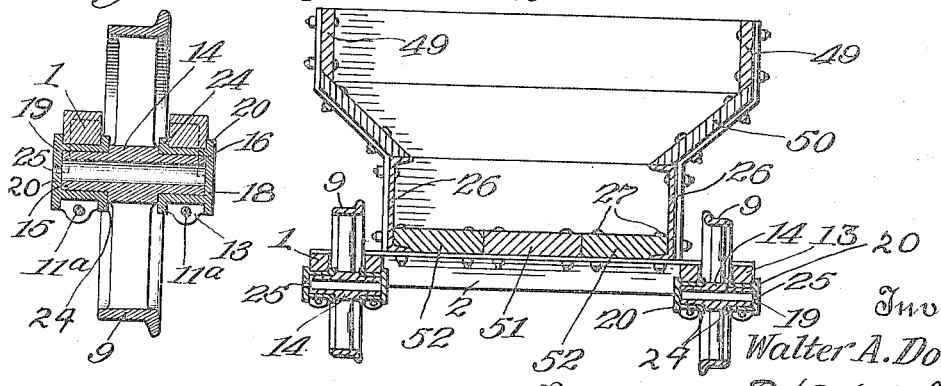

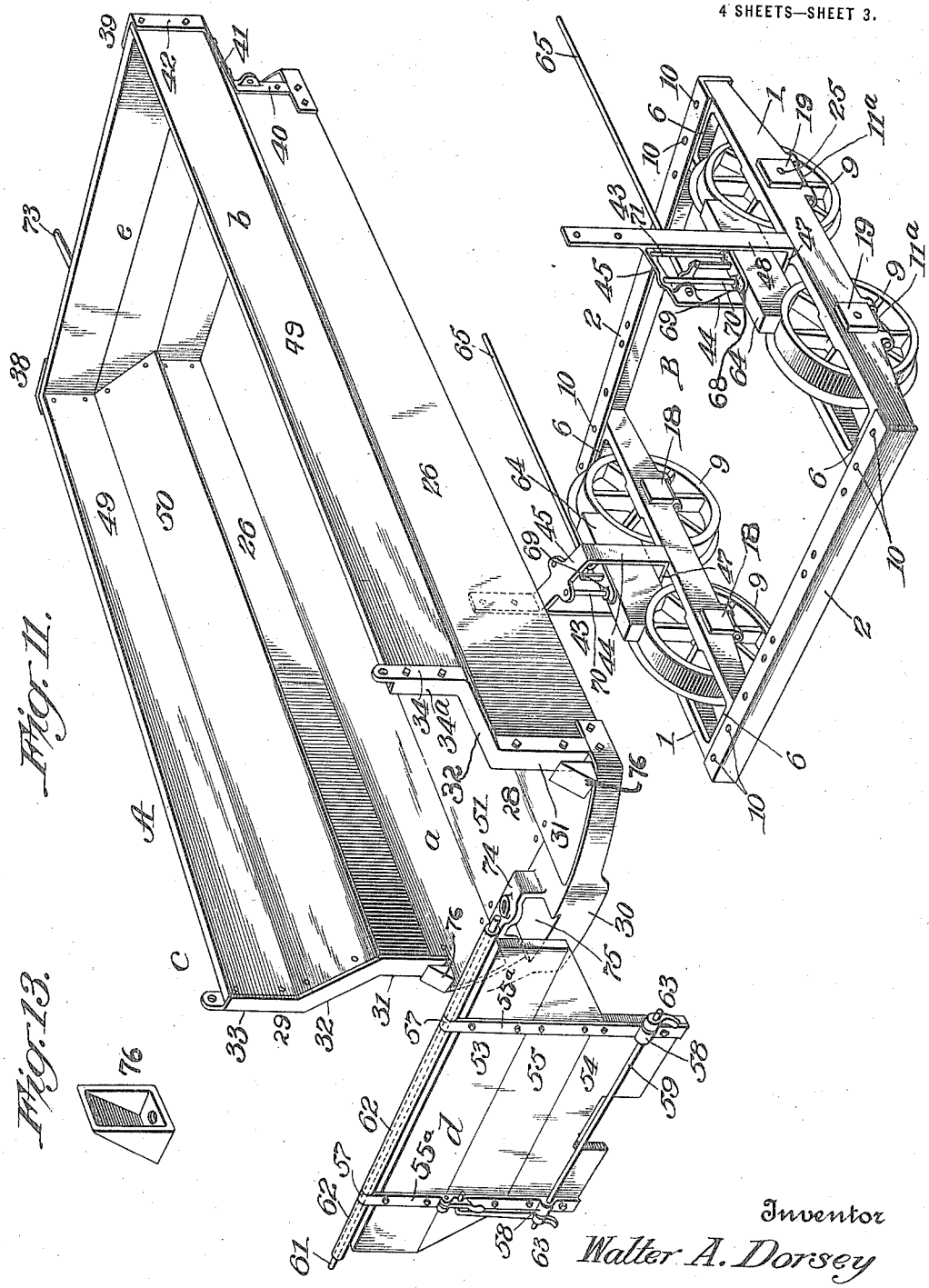

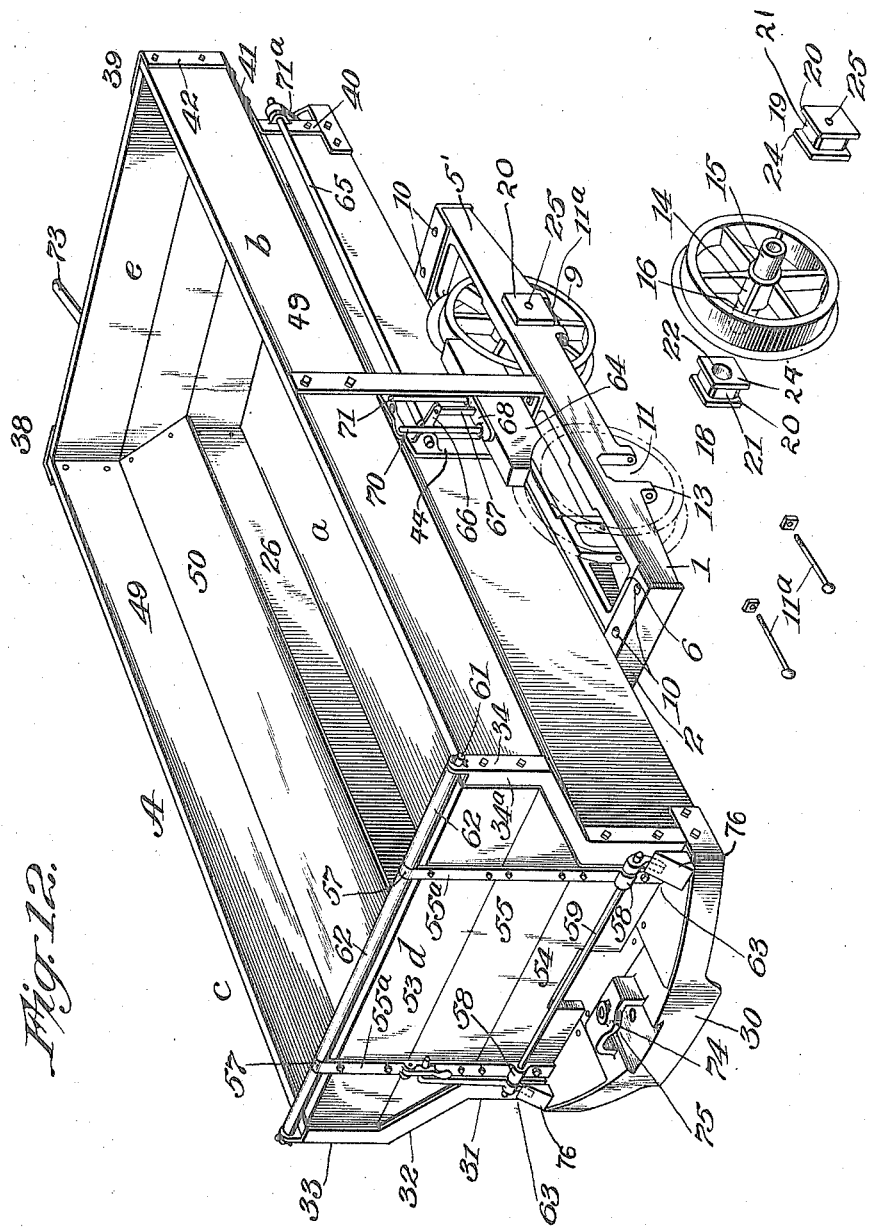

UNITED STATES PATENT OFFICE.

WALTER A. DORSEY, OF COLUMBUS, OHIO, ASSIGNOR TO THE BONNEY-FLOYD COMPANY, A CORPORATION OF OHIO.

CAR.

1,417,044. Specification of Letters Patent. Patented May 23, 1922.

Application filed July 7, 1919, Serial No. 308,954. Renewed February 24, 1922. Serial No. 539,055.

*To all whom it may concern:*

Be it known that I, WALTER A. DORSEY, a citizen of the United States, residing at Columbus, in the county of Franklin and State of Ohio, have invented certain new and useful Improvements in Cars, of which the following is a specification, reference being had therein to the accompanying drawing.

This invention relates to improvements in cars, particularly improvements in cars of the class used in coal mines for carrying the mined coal from the interior of the mines to the tippling and screening mechanism, also industrial plant cars.

The object is to provide a simple construction which will embody all of the advantageous features of the cars of the better class now in use, and will have the parts so constructed and arranged as to be more durable. As is well known, these cars are subjected to rough usage, and must sustain severe strains and stresses. They are coupled together in long trains, and although necessarily restricted in size, each carries, in many cases, two tons of material. The rail tracks in the mines or industrial plants cannot, with economy, be laid with precision. The grades are often excessive and change of grade frequently met. The curves in the tracks are on short radii, and are repeated at frequent intervals along the system.

In consequence the quick variations in inertia cause bumps of the heavily loaded cars against each other, successively along the train, alternating soon with sharp jerks and pulls. At the curves the tendency of the highly speeded cars is to bear laterally against the track rails and they exert tremendous displacing force with strains and torsion upon the wheels and axles, and on the devices by which they are secured to the body.

One of the objects of the present invention is to provide a novel mounting for the wheels, whereby through axles can be dispensed with, and the wheels of each pair, transversely, will be independent of each other in respect to their revolution and slippages.

Another object is to provide a mounting for the wheel elements in a frame at the base of the body, which is stronger than any with which I am acquainted, and provides for coupling each car unit to its neighbors in such manner that the shocks can be received without danger to the wheel mountings.

Another object is to mount upon the base frame the parts of the load receiver or body in such way that the upper parts of the side walls and of the end walls are relieved from the destructive strains that are transmitted to them in other cars.

Another object is to combine with each of the cars an efficient brake mechanism by which the car can be independently controlled.

Fig. 1 is a side elevation of a mining car embodying my improvements.

Fig. 2 is a bottom view of the same.

Fig. 3 is an elevation taken from the end carrying the pivoted gate.

Fig. 4 is an end elevation showing the end opposite that shown in Fig. 3.

Fig. 5 is a vertical section on the line 5—5 Fig. 1.

Fig. 6 is a top view of one of the longitudinal bars or sill elements for supporting the wheel.

Fig. 7 is a side view and Fig. 8 is an end view of the part shown in Fig. 6.

Fig. 9 is one of the central bracing uprights of the frame.

Fig. 10 is an elevation of this upright taken while looking transversely of the car.

Fig. 11 is a perspective view taken from the front end of the car, and illustrating the body as separated from the truck after being lifted directly upward therefrom.

Fig. 12 is a perspective taken from the front showing the body in position on the truck, and also showing one of the wheels and its bearings as detached.

Fig. 13 shows a lock stop for the door.

Fig. 14 is a vertical section taken centrally through one of the wheels, its boxes and the parts of the frame on which it is mounted.

The car, as an entirety, is composed of the body or load-holding part A and the truck B. The body is formed with a bottom and with sides indicated respectively, as entireties, by *a*, *b*, *c*, together with a front gate or movable closure *d*, and a rear rigid end wall *e*.

The truck element B comprises longitudinally arranged sill elements 1, 1, one on each side and cross girt bars 2, 2, respectively, secured thereto. Each of the longitudinal elements 1 is a casting having a central part 3 and end parts 3′, 3′. See Figs. 6, 7. Each end part has two opposite parallel arms 4, 4′ and 5, 5′. The side arms are joined by integral cross bar elements 6, 6 at the ends, and a central cross bar 7. Each sill element 1, therefore, considered as an entirety, has open spaces 8, 8, in which are positioned the flanged track wheels 9, 9.

Each of the cross girt bars 2 (preferably of wrought steel) is at each end connected to one of the cross bars 6 of the wheel supporting elements 1, by bolts 10.

The wheels 9, 9 are each mounted as follows:

Each sill element 1 is cast with downwardly extending lugs or plates 13, 13, spaced apart to provide an open bottom chamber 11. In these spaces are fitted the axle boxes, each wheel having two boxes, respectively, close to the end of its hubs.

There is no through axle in the construction, that is, an axle extending from the right hand wheel of a pair across to the other wheel. Each wheel has its own short axle element independent of the mountings of the others.

As shown in Figures 5 and 14, each wheel is formed with a hub part 14, which is integral with the spokes and tread. This hub is tubular, having a relatively large axial aperture at its center. It is formed with integral laterally projecting tubular extensions 15 and 16, each extending a short distance beyond the vertical plane of the wheel face.

The boxes are indicated by 18 and 19. Each box is a single piece of metal, having at its ends radial flange plates 20 and 24. The intermediate part is approximately square in vertical section. It is formed with a cylindrical seat or chamber 22, to receive one of the projecting axles or spindles 15, 16, this seat or chamber extending through the flange plate 24 at one end of the box. The reduced part 21 of the metal surrounding this seat, or chamber, is of such exterior dimensions that it fits snugly in the space or chamber 11 in the wheel-carrying sills, and its dimensions are such that it can be turned to either of four positions. If after a period of use it is found that wear has occurred upon that part of the wall or chamber 22, which has been subjected to wear, the box can be turned so as to bring the unworn part of the surface into operating position. When a box is in position the flange 20 fits against the outside of flanges 13, and the plate 24 fits against their inner sides. Each box is locked in position by means of a pin 11ᵃ passing through apertures in the lower ends of the flanges 13. The outer cap or flange plate 20 is similar to that at 24, except that it has no axle passage, and is provided with a reduced aperture 25 at its axis for the introduction of lubricant.

It will be seen that the wheel and its mountings comprise only three pieces of metal. It will also be observed that each wheel 9 of a transverse pair is mounted and can rotate entirely independently of its companion. Sharp curves can be taken and differences in speeds of the two wheels are provided for by such mountings. Heretofore cars of this class have had the wheels of a pair mounted upon cross axles, in some cases rigidly connected to each of the wheels; in others connected to one rigidly and to the other loosely, and in still others the axle has been loose in respect to both wheels. But in any construction where a relatively long axle extends from wheel to wheel, experience has shown that it is impossible to prevent some of the variations in speed and movement as concerns one wheel affecting the opposite one, even when the axles were loose in both.

The body or load-carrying part of the vehicle, and the means by which each car is coupled to its neighbors, are mounted upon the above described wheel-carrying sill elements 1 and the cross girt bars 2.

26, 26 are longitudinally arranged, wide, U-shaped metallic channel plates or wood plank, one at each side of the car. They are secured to the truck frame by vertical bolts at 27. These channel plates 26 are at their front ends secured to the strong transversely arranged steel bumper casting 30, and also to the upright corner brackets 28, 29.

Each of these brackets has an inner vertical part 31, an outer vertical part 33 and an intermediate inclined part 32. When considered in horizontal section they are L-shaped, that is, are composed of two integral flange plates 34 and 34ᵃ, the flange 34 being at the outer face of the sides of the car body, and the flange 34ᵃ is positioned to overlap the front face.

At the rear ends, the wide channel plates 26 are rigidly secured to the second bumper casting 37, and also secured to rear corner bracket uprights 38 and 39. Each of the latter has an inner vertical part 40, an outer vertical part 42 and an intermediate inclined part 41. And each, in horizontal section, is formed with flanges positioned as to the longitudinal planes and the transverse planes of the car body in the way above specified, when describing the front corner brackets.

At the center, longitudinally, of the car are provided two bracket uprights 43, one on each side. Each of these has an inner vertical element 44, an outer vertical part 46 and an intermediate inclined part 45, which respectively lie in the longitudinal vertical planes of the corresponding parts of the front and rear corner bracket uprights. The central brackets 43 also have, integral with the parts above specified, a foot bar or plate 47 and a vertical extension 48 of the upper part 46. Each of these central brackets 43 rests upon and is bolted to the central cross bar 7 of the sill element 1 of the wheel carrier. The wide channel plates 26, the corner brackets and the central brackets furnish the supports for firmly fastening in place the planks which serve as closures for the bottoms, the sides and the rear end of the body. Each side wall has a plank or steel sheet 49 fitted to the vertical parts of the brackets, and an inclined plank or steel sheet 50, which rests upon the upper flange of the channel plates 26, and which is also secured to the inclined parts of the corner and central brackets.

The side walls of the bottom section of the body are formed of the channel bars 26, these being of sufficient width, vertically, to meet this supplemental purpose.

The planks at the bottom are indicated by 51, 52, the latter being chamfered to fit the bottom flanges of the channel plates 26. As shown in Fig. 2 they are extended longitudinally to fit snugly and firmly against the front and rear flanges, respectively, of the bumper bars 30 and 37. The inner vertical parts 44 of the central bracket uprights 43 are rigidly bolted to the U-beams or channel plates 26, and as these brackets support some of the lighter movable parts of the structure (to be described), the latter are held against displacement from their predetermined position by the rigidity of the channel plates 26 and the firm fastening of the brackets 43 to the truck frame, as described.

The front closure $d$ of the car is a longitudinally swinging gate or door comprising the long upper cross blank or steel sheet 53, the short plank 54 and the intermediate one at 55. These are secured to vertically arranged bars 55ª, having pivot eyes 57 at their upper ends, and bearings 58 near their lower ends. In these bearings a cross shaft 59 is mounted. Through the pivot eyes 57 is passed the pivot rod 61, which is mounted in extensions of the front corner brackets 28, 29. The end gate is held in proper position, transversely, by spacing sleeves 62.

One of the vertical bars 55ª is provided with devices serving to lock or hold the gate in position, co-acting with the latching devices at 63. These latches are adapted to engage with lock stop 76 on the bumper head 30.

The car is controlled by brakes comprising wooden blocks or equivalents 64, positioned to frictionally engage with the wheel treads.

Above each block is a short horizontal shaft 65, carrying a crank arm 66, pivoted to the upper end of arm 67, forming part of a casting, which also has a plate 68 secured to the block and formed with guide eyes 69. 70, 71 are guide rods fitting in these eyes, and working with them to vertically guide the block.

One of the rock shafts 65 is connected directly to the operating lever 73, mounted immediately behind and close to the outer face of the rear end of the body. The other rock shaft 65 extends to the rear of the body, and is there provided with a crank arm 71ª, which by the medium of a link 72 is connected to a hand lever 73. The connections are so made that the brake blocks are simultaneously and uniformly moved downward or upward as the lever 73 is moved to the right or to the left.

Each of the cross bumper bars 30, 37 is formed with a bracket 74, for receiving the coupling link of an adjacent car and with a seat for the coupling pin 75.

The wide, vertically arranged channel plates 26, each situated at one side of the lower transversely contracted section of the body, and rigidly secured to the bumper and coupling bars at the ends of the car, insure that the thrusts and strains received by or exerted at one of the bumper and coupling bars will be transmitted to the other without imparting strains or stresses to the upper parts of the car body, that is, the closure elements of the side walls and end walls, and the uprights which surround the upper wider part of the body. The wide, longitudinally arranged channel plates and the bumper and coupling bars at the ends constitute a base frame for the body, and the latter, together with this base frame are, as a unitary structure, separable from the truck frame, which latter is also a unitary structure comprising the cross girt bars and the longitudinally disposed sill bars which directly carry the wheels. This truck frame is short relatively to the car, and has its parts so disposed as to give the greatest strength and steadiness to the wheel mountings. Each wheel can be separated from the car, as a whole, independently of the other parts for the adjustment of its bearings, or other purpose; both of the wheels on either side can be removed together by removing their supporting sill; or the entire wheel system can be separated from the body and its base.

I herein have particularly mentioned "mine cars," but it will be readily understood that more or less similar structures, possibly with differing bodies, embodying my improvements, can be made for haulage at points outside of mines; and I do not limit the matters essential to the invention to cars designed for any particular purpose.

What I claim is:

1. In a mine or industrial car, a relatively short truck frame having two wheel supporting sills, one at each side of the car, and comprising two longitudinal bars and two short end bars integral with the longitudinal bars and the cross girts each rigidly secured to both of the side sills, said sills and girts forming a unitary frame, in combination with the car body and its base frame constituting a unitary structure separably connected to the truck frame and the base having the end bumper bars, the relatively wide vertically disposed angle plates at the sides of the car, the uprights, and the wall closing elements rigidly secured to said end bars, side plates and uprights.

2. In a mine or industrial car, a body and a base frame therefor, in combination with a separable truck frame comprising transverse girt bars, and two side sills each extending from one girt bar to the other and rigidly connected to both and formed of two longitudinal bars and two short end bars cast integrally with the longitudinal bars and enclosing a narrow wheel space adapted to have two wheels mounted therein at the side of the car independently of the wheels at the other side of the car mounted in the other side sill.

3. In a mine or industrial car, the relatively short truck frame comprising two girt bars extending from side to side of the car, two longitudinal sill elements, one at each side of the car and extending integrally from one girt to the other and adapted to support two of the track wheels, in combination with a unitary base frame for the car body rigidly but separably connected to the truck frame, said base frame comprising two longitudinally arranged vertically disposed angle plates rigidly secured detachably to the aforesaid girts of the truck frame and comprising also end bumper and coupling bars rigidly secured to the adjacent ends of the said side angle plates.

4. In a mine or industrial car having a body with an upper transversely wide load-carrying section and a lower transversely contracted section, the combination of the truck frame, the body frame including a base, the uprights, the end coupling and bumper bars, and the longitudinally arranged vertically extended channel plates, one at each side of the narrow section of the body, and arranged to transmit thrusts from one bumper and coupling bar to the other and to support the closure elements of the end walls and the side walls of the upper wider body section.

5. In a mine or industrial car having a body formed with an upper transversely wide load-carrying section and a lower transversely contracted section, the combination with the truck frame, of the two relatively wide longitudinally disposed channel plates at the sides of the lower section of the body, and extending from the bottom to the top of said section, and the closure elements of the side walls and end walls of the upper wider section resting upon and rigidly connected to said longitudinal plates.

6. In a mine or industrial car having a body formed with an upper transversely wide load-carrying section, and a lower transversely contracted section, the combination with the truck frame, of the bumper and coupling bars at the ends of the car, the wide vertically extended metallic channel plates rigidly connected to the said coupling bars and to the truck frame, and extending vertically from the bottom to the top of the narrow lower body section, and the closure elements of the side walls and the end walls of the upper wider body section rigidly secured to and carried by the said channel plates.

7. In a mine or industrial car having a body with an upper transversely wide load-carrying section and a lower transversely contracted section, the combination of the truck frame having the track wheels mounted thereon, the uprights, the closure elements of the side walls and end walls secured to the uprights, the end bumper and coupling bars, and the wide metallic channel plates, one at each side of the narrow lower body section and each secured rigidly to the said end bumper and coupling bars and arranged to receive longitudinal thrusts and strains from either bumper and coupling bar and transmit them to the other independently of the truck frame and of the upper parts of the car.

8. In a mine or industrial car the combination with the separable unitary body having a base frame with a closed bottom, of a unitary truck detachably secured to said base frame and comprising four wheels two at each side of the truck, a relatively short axle for each wheel and two wheel carriers one at each side of the truck and each being a narrow unitary frame having integral longitudinal side bars in which two of said short axles are mounted on fixed transverse lines and transverse bars rigidly connecting the two wheel carriers.

9. In a mine or industrial car, the combination with a separable unitary body having a base frame with a closed bottom of the truck detachably connected to said base frame and comprising four wheels, two positioned at each side of the truck, a short axle for each wheel, two boxes for each axle both on the same side of the central longitudinal line of the car, and two longitudinally positioned bars at each side of the truck and at the sides of two of said wheels, the boxes of the said two wheels being supported in the said longitudinal bars and held therein rigidly against longitudinal movement, and cross bars rigidly connecting together the longitudinal bars on one side of the truck and the longitudinal bars on the other.

10. The herein described structural element for the truck of a mine or industrial car having the side bars 4, 5 and 4' 5' and the end bars 6 all cast integrally together and surrounding a narrow wheel space adapted to receive two wheels, each side bar being formed with two box receiving spaces 11 for the mounting of short axles, each carrying one of said wheels and adapted to hold the said axles on transverse lines fixed in relation to said side bars.

In testimony whereof, I affix my signature, in presence of two witnesses.

WALTER A. DORSEY.

Witnesses:
 EARLE O. BUXTON,
 CHAS. F. STEPHEN.